(12) United States Patent
Lee et al.

(10) Patent No.: US 7,327,576 B2
(45) Date of Patent: Feb. 5, 2008

(54) HEAT DISSIPATION DEVICE

(75) Inventors: Hsieh-Kun Lee, Tu-Cheng (TW);
Xue-Wen Peng, Shenzhen (CN); Bing Chen, Shenzhen (CN); Rui-Hua Chen, Shenzhen (CN)

(73) Assignees: Fu Zhun Precision Industry (Shenzhen) Co., Ltd., Bao'an District, Shenzhen, Guangdong Province (CN); Foxconn Technology Co., Ltd., Tu-Cheng, Taipei Hsien (TW)

( * ) Notice: Subject to any disclaimer, the term of this patent is extended or adjusted under 35 U.S.C. 154(b) by 165 days.

(21) Appl. No.: 11/166,311

(22) Filed: Jun. 24, 2005

(65) Prior Publication Data

US 2006/0291172 A1    Dec. 28, 2006

(51) Int. Cl.
*H05K 7/20* (2006.01)
(52) U.S. Cl. .................. 361/719; 361/700; 257/715; 174/15.2; 165/80.4
(58) Field of Classification Search ........ 361/699–700, 361/695–697, 704–707, 719–715; 257/715; 174/15.2; 165/80.4, 104.26
See application file for complete search history.

(56) References Cited

U.S. PATENT DOCUMENTS

| | | | |
|---|---|---|---|
| 5,845,702 A | 12/1998 | Dinh ..................... 165/104.21 |
| 5,960,865 A | 10/1999 | Costa et al. .................. 165/86 |
| 6,181,556 B1 | 1/2001 | Allman ...................... 361/690 |
| 6,918,429 B2* | 7/2005 | Lin et al. .................... 165/80.3 |
| 6,937,474 B2* | 8/2005 | Lee .............................. 361/715 |
| 7,019,974 B2* | 3/2006 | Lee et al. .................... 361/700 |
| 7,028,758 B2* | 4/2006 | Sheng et al. ............ 165/104.21 |
| 2005/0257532 A1* | 11/2005 | Ikeda et al. .................... 62/3.7 |

* cited by examiner

*Primary Examiner*—Javaid H. Nasri
(74) *Attorney, Agent, or Firm*—Morris Manning Martin LLP; Tim Tingkang Xia, Esq.

(57) ABSTRACT

A heat dissipation device for being installed to and cooling an electronic card device (40) includes first and second heat dissipation units (10, 20) and at least one heat pipe (30). The heat dissipation units each include a base plate (12, 22) and a fin plate (14, 24) engaged with the base plate. The at least one heat pipe includes an evaporating segment (32) received between the base plate and the fin plate of the first heat dissipation unit, and a condensing segment (34) received between the base plate and the fin plate of the second heat dissipation unit, thereby connecting the first and second heat dissipation units together. The evaporating segment and the condensing segment of the at least one heat pipe are movably received in the first and second heat dissipation units respectively before the heat dissipation device is installed to the electronic card device and dissipating heat generated therefrom, and are firmly secured in the first and second heat dissipation units respectively after the heat dissipation device is installed to the electronic card device and dissipate heat generated therefrom.

21 Claims, 5 Drawing Sheets

HEAT DISSIPATION DEVICE

BACKGROUND

1. Field

The present invention relates to a heat dissipation device, and more particularly to a heat dissipation device suitable for removing heat from chips mounted on add-on cards, such as VGA cards, sound cards or network cards.

2. Prior Art

A central processing unit (CPU) is a core of a computer. The CPU generates a great quantity of heat during operation and needs to be cooled to keep the CPU working normally.

Significant performance of a computer needs assistance from a variety of electronic devices optionally installed in the computer. Examples of these electronic devices include a VGA card which processes video information transmitted from the CPU in its own chip and transmits the processed information to a monitor to allow a user to view texts or graphics, a sound card which can enable a computer to manipulate and output sounds or to record sound input from a microphone connected to the computer, or a network card which may be inserted into a computer so the computer can be connected to a network. These cards also generate heat during operation and need to be cooled, especially for high-level VGA cards which are designed to enable intensive graphics processing or 3-dimension gaming and take part of the task charged to the CPU. Thus, heat dissipation devices are required to remove heat which is generated during operation of these cards. If the heat is not timely removed, it may adversely affect the performance of the cards.

Conventionally, a card may be cooled by attaching a heat sink on the heat-generating chip of the card. The heat sink is more bulk; the heat dissipation efficiency is greater. However, it is impractical to install a bulk heat sink because the space between cards is usually limited.

SUMMARY

Accordingly, what is needed is a heat dissipation device which is suitable to be installed to an add-on card, such as a VGA card, a sound card, or a network card to remove heat therefrom.

A heat dissipation device for cooling an add-on card in accordance with a preferred embodiment of the present invention comprises first and second heat dissipation units and at least one heat pipe. The heat dissipation units each include a base plate and a fin plate engaged with the base plate. The at least one heat pipe includes an evaporating segment received between the base plate and the fin plate of the first heat dissipation unit, and a condensing segment received between the base plate and the fin plate of the second heat dissipation unit, whereby the first and second heat dissipation units are connected by the heat pipe. The evaporating segment and the condensing segment of the at least one heat pipe are movably received in the heat dissipation units respectively before the heat dissipation device is installed to the add-on card, and are secured in position and thermally connected with the heat dissipation units respectively after the heat dissipation device is installed securely to the add-on card.

Other advantages and novel features of the present invention will become more apparent from the following detailed description when taken in conjunction with the accompanying drawings, in which:

DETAILED DESCRIPTION OF THE PREFERRED EMBODIMENT

Figure 1:
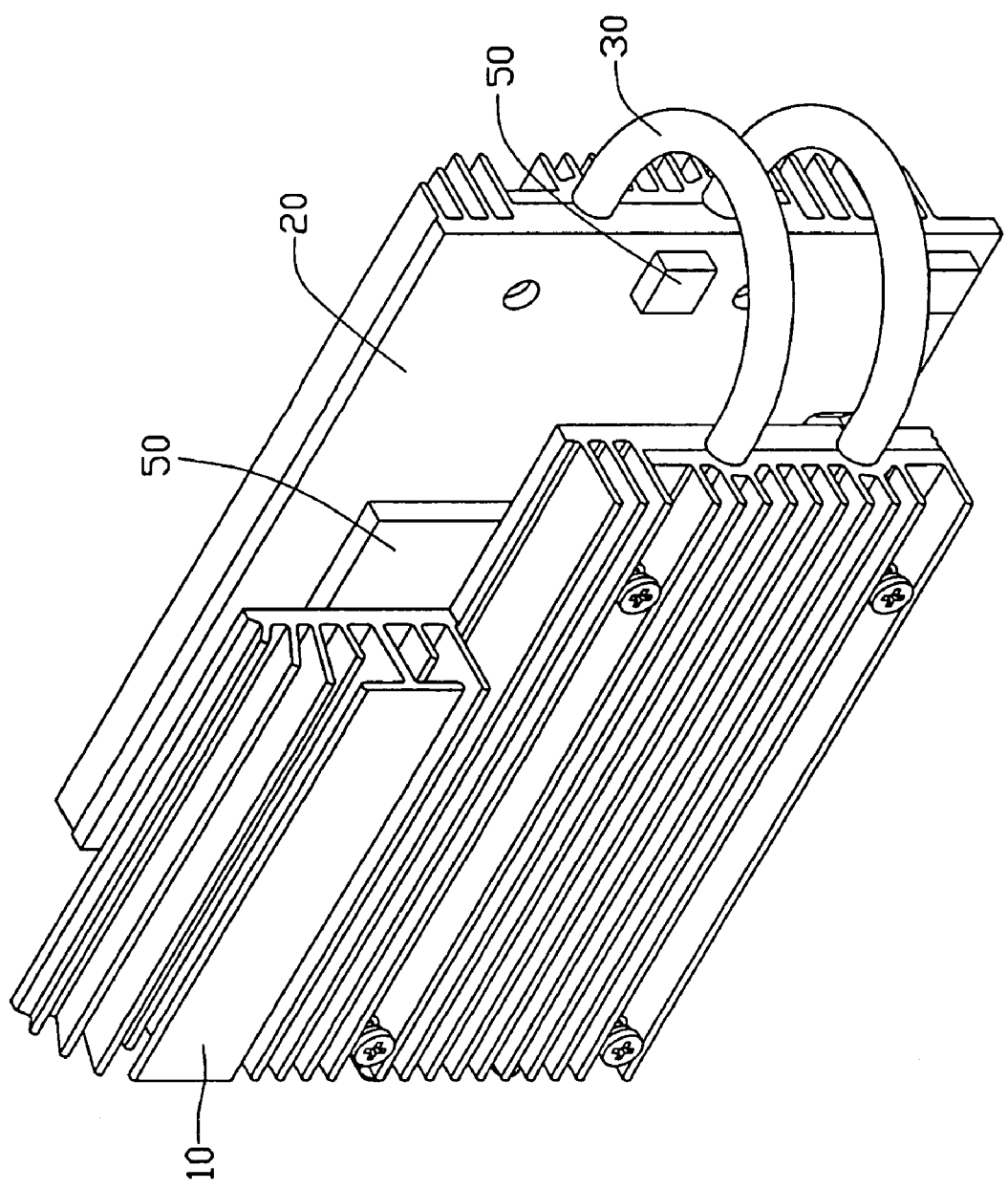
FIG. 1 is an assembled, isometric view of a heat dissipation device in accordance with a preferred embodiment of the present invention.

Referring to FIGS. 1-6, a heat dissipation device of a preferred embodiment of the invention comprises a first heat dissipation unit 10, a second heat dissipation unit 20 and a pair of heat pipes 30 thermally connecting the first and second heat dissipation units 10, 20. The heat dissipation device is used to remove heat from a chip 42 mounted onto an add-on card 40, such as a VGA card (best see in FIG. 6). The card 40 defines a pair of spaced orifices 46 therein adjacent to the chip 42.

Figure 2:
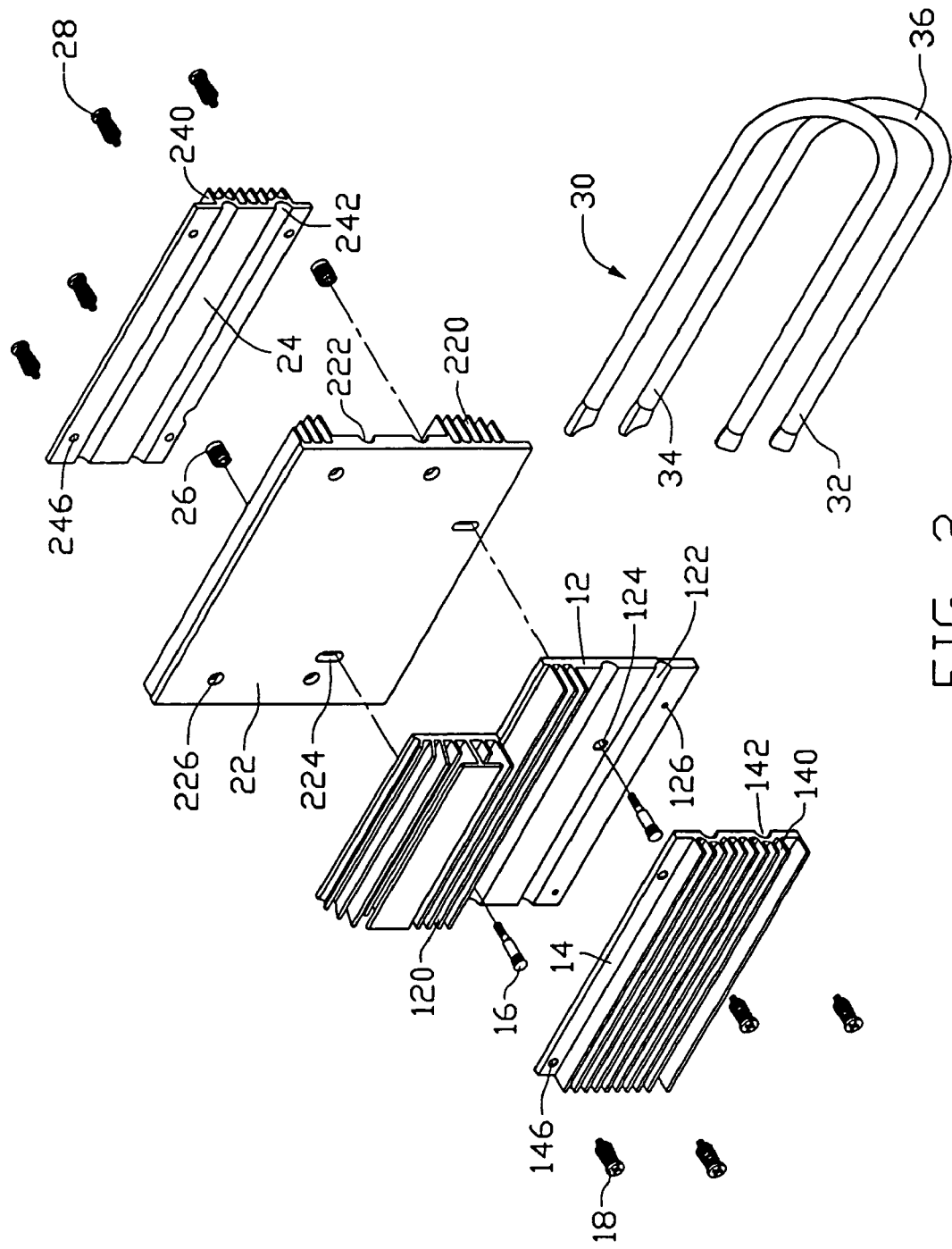
FIG. 2 is an exploded view of FIG. 1.
Figure 3:
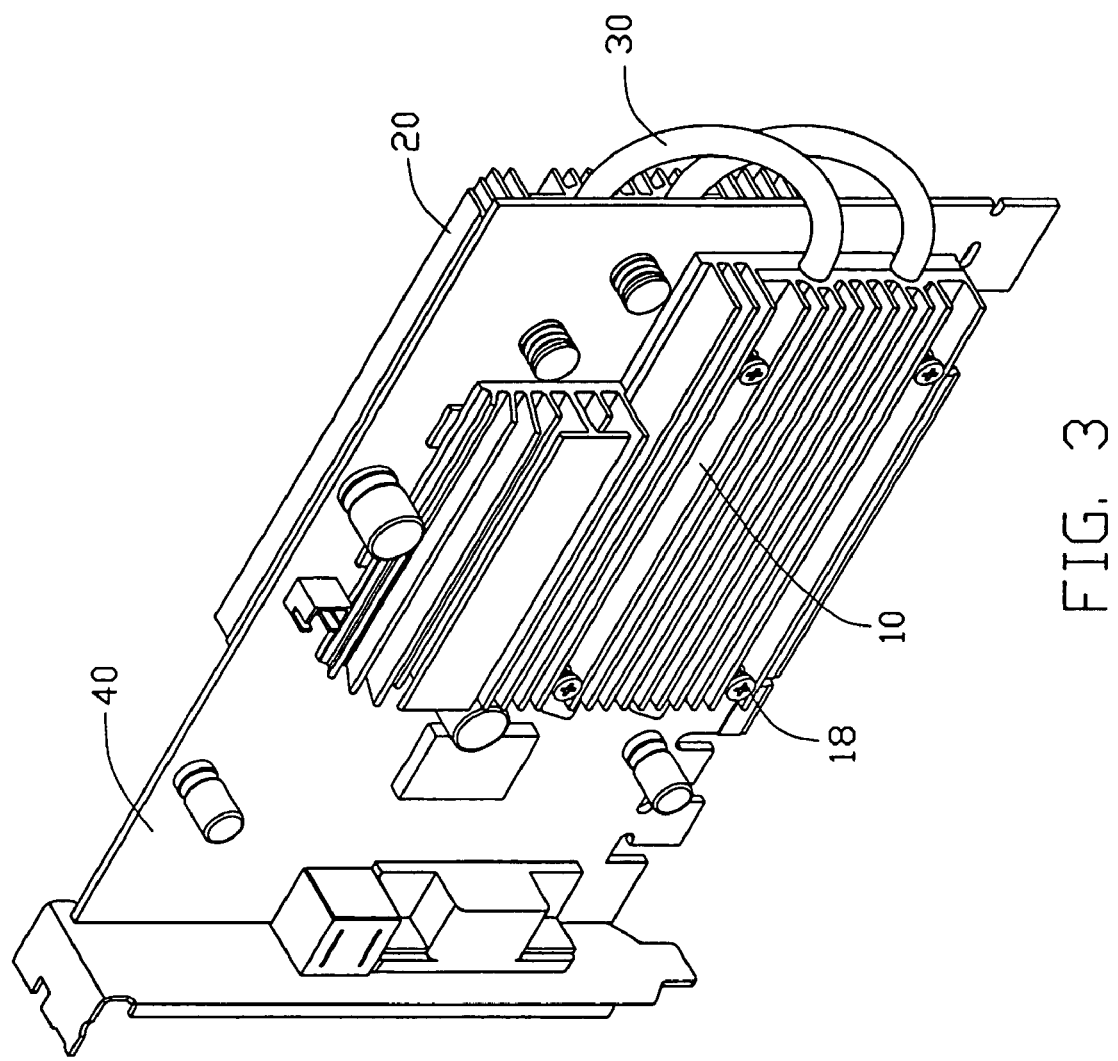
FIG. 3 is an assembled, isometric view of the heat dissipation device of FIG. 1, being mounted onto an add-on card to remove heat from a chip thereof.

Particularly referring to FIG. 2, the first heat dissipation unit 10 comprises a base plate 12 and a fin plate 14 securable to the base plate 12. The base plate 12 is used for engaging with the chip 42 so that heat generated by the chip 42 is first absorbed by the base plate 12. The base plate 12 comprises a finned portion (not labeled) having a plurality of fins 120 projecting perpendicularly therefrom, for facilitating heat dissipation. The base plate 12 further comprises an un-finned portion (not labeled) in which a pair of first grooves 122, two bores 124 and four screw holes 126 are defined. The four screw holes 126 are arranged generally at four corners of the un-finned portion of the base plate 12. The first grooves 122 are parallel to each other and disposed between the screw holes 126. The bores 124 are positioned corresponding to the orifices 46 of the card 40. A pair of pins, such as bolts 16 is used to extend through the bores 124 of the base plate 12 and the orifices 46 of the card 40. The base plate 12 is formed by extrusion to integrally form the finned and un-finned portions (not labeled).

The fin plate 14 is attached onto the un-finned portion (not labeled) of the base plate 12 to be juxtaposed with the fins 120 of the base plate 12. The fin plate 14 comprises a plurality of fins 140 extending perpendicularly therefrom, and defines a pair of parallel second grooves 142 in a face of the fin plate opposite to that from which the fins 140 project. Four through holes 146 are defined in the fin plate 140, at positions corresponding to those of the screw holes 126 of the base plate 12 respectively. Four screws 18 each having a spring (not labeled) wrapping therearound are extended through the through holes 146 of the fin plate 14 and screwed into the screw holes 126 of the base plate 12, so that the fin plate 14 is attached to the un-finned portion (not labeled) of the base plate 12, whereby heads (not labeled) of the bolts 16 are inescapably received in the bores 124 of the base plate 12. The first and second grooves 122, 142 are cooperated to form two holes for partly receiving the heat pipes 30 therein. At this stage, the springs (not labeled) wrapping around the screws 18 are partly compressed to press the fin plate 14 toward the base plate 12. The screws 18 are screwed into the screw holes 126 to such a degree that the fin plate 14 and the base plate 12 are not tightly connected together and the heat pipes 30 are movably received in the holes formed by the grooves 122, 142.

Referring also particularly to FIG. 2, the second heat dissipation unit 20 comprises a base plate 22 and a fin plate 24. The base plate 22 comprises a plurality of fins 220 extending perpendicularly therefrom and an un-finned portion (not labeled) at a central portion thereof. The fin plate 24 is attached to the un-finned portion (not labeled) of the base plate 22. The un-finned portion (not labeled) of the base plate 12 defines a pair of first slots 222 and four screw holes 226 therein. The base plate 22 further defines a pair of spaced elliptical notches 224 therein positioned corresponding to the bores 124 of the first heat dissipation unit 10. The notches 224 are deviated from the finned portion (not labeled) of the base plate 22 in the preferred embodiment.

The fin plate 24 of the second heat dissipation unit 20 is attached to the un-finned portion (not labeled) of the base plate 22. The fin plate 24 comprises a plurality of fins 240 extending perpendicularly therefrom, and defines a pair of parallel second slots 242 in a face of the fin plate 24 opposite to that from which the fins 240 project. Four through holes 246 are defined in the fin plate 240, positioned corresponding to the four screw holes 226 of the base plate 22 respectively. Four screws 28 each having a spring (not labeled) wrapping therearound are extended through the through holes 246 of the fin plate 24 and screwed into the screw holes 226 of the base plate 22, so that the fin plate 24 is attached to the un-finned portion (not labeled) of the base plate 22. The first and second slots 222, 242 are cooperated to form two holes for partly receiving the heat pipes 30 therein. At this stage, the springs (not labeled) wrapping around the screws 28 are partly compressed to press the fin plate 24 toward the base plate 22. The screws 28 are screwed into the screw holes 226 to such a degree that the fin plate 24 and the base plate 22 are not tightly collected together and the heat pipes 30 are movably received in the holes formed by the slots 222, 242.

Each heat pipe 30 is U-shaped. Each heat pipe 30 comprises an evaporating segment 32 movably received in a corresponding hole cooperatively defined by the first and second grooves 122, 142, and a condensing segment 34 movably received in a corresponding hole cooperatively defined by the first and second slots 222, 242. Thermal conduct media, such as thermal grease is applied on outer surfaces of the evaporating segments 32 and the condensing segments 34 of the heat pipes 30 to enhance heat-transfer between the heat pipes 30 and the heat dissipation units 10, 20. In the preferred embodiment, free ends of the heat pipes 30 are pressed to have a flat configuration to prevent the heat pipes 30 from moving out of the heat dissipation units 10, 20 after the fin plates 14, 24 are respectively assembled to the base plates 12, 22 to sandwich the evaporating and condensing segments 32, 34 of the heat pips 30 therebetween.

In the preferred embodiment, a plurality of pads 50 is arranged on the base plates 12, 22 to electrically isolate the first and second heat dissipation units 10, 20 from the card 40. The pads 50 can further uniformly distribute force of the first and second heat dissipation units 10, 20 exerting on the card 40. Additionally, accidental or sudden impact on the first and second heat dissipation units 10, 20 can be absorbed by the pads 50 whereby the card 40 is protected from being damaged.

Figure 5:
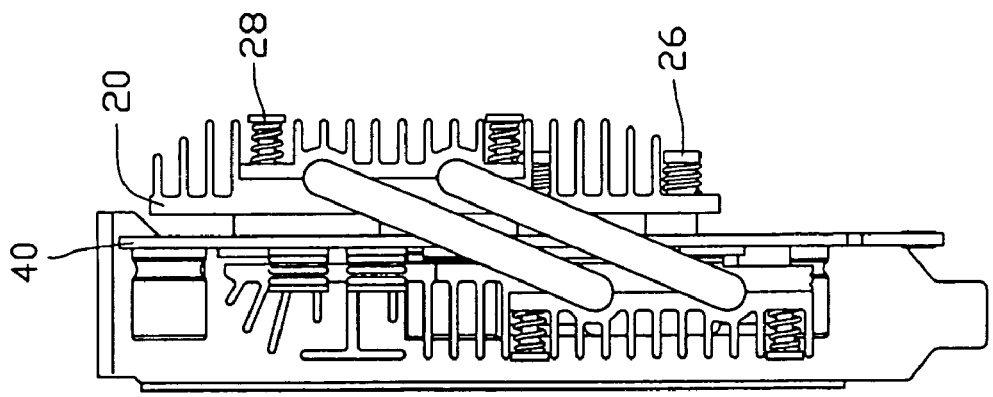
FIG. 4 and FIG. 5 are side views showing the process of installing the heat dissipation device to the add-on card.
Figure 4:
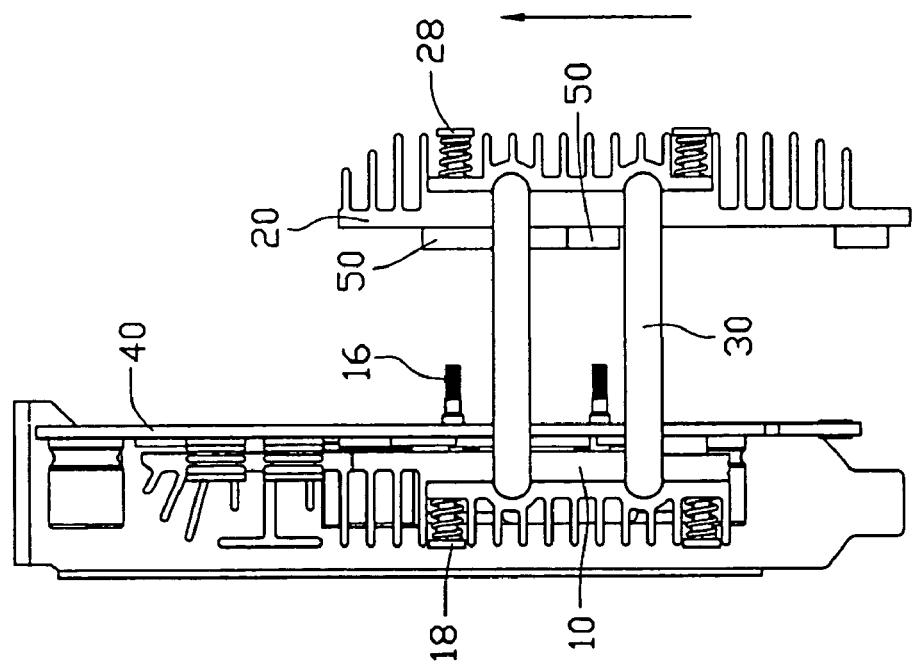
Figure 6:
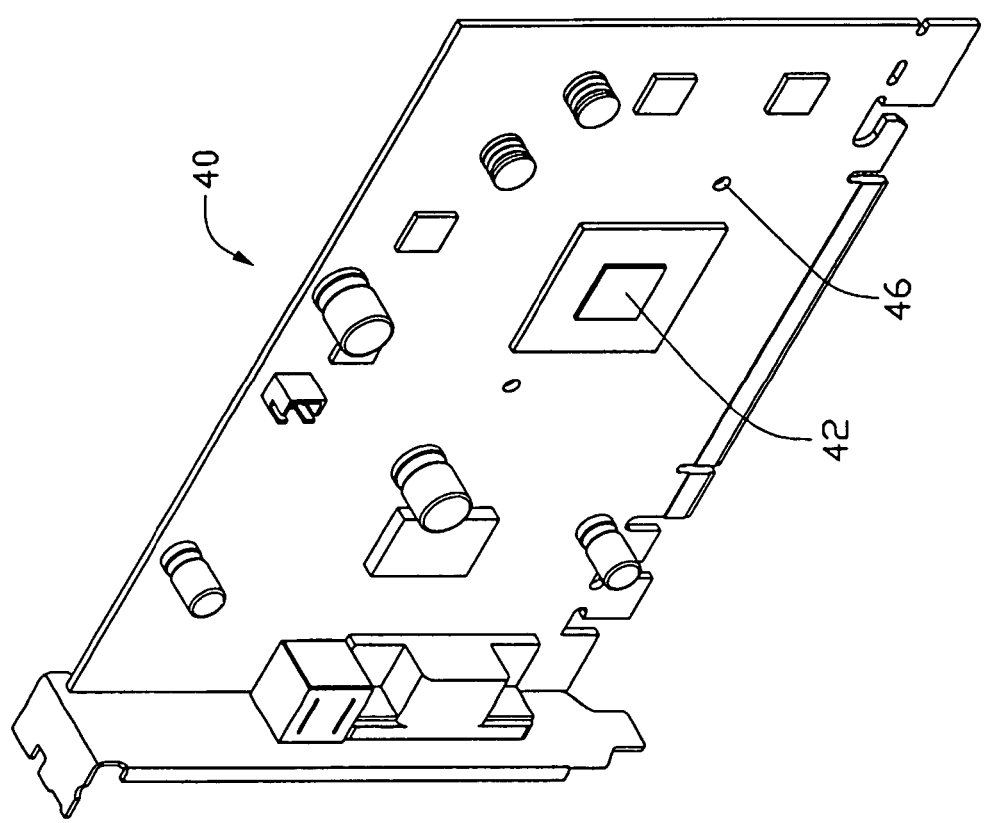
FIG. 6 is an isometric view of the add-on card.

Referring particularly to FIGS. 4-5 together, to install the heat dissipation device to the card 40, the first and second heat dissipation units 10, 20 are separated at a distance large enough so that the card 40 can be easily interposed between the first and second heat dissipation units 10, 20. The bolts 16 are inserted through the orifices 46 of the card 40 (FIG. 6) so that the first heat dissipation unit 10 is placed on the chip 42 of the card 40, having the base plate 12 being in contact with the chip 42 and having the pads 50 of the first heat dissipation unit 10 being in contact with the card 40. The second heat dissipation unit 20 is then moved in a direction as shown by an arrow of FIG. 4, accompanied with that the evaporating and condensing segments 32, 34 of the heat pipes 30 movably retained in the first and second heat dissipation units 10, 20 are rotated in the first and second heat dissipation units 10, 20 respectively. The second heat dissipating unit 20 is thus moved to reach a position as shown in FIG. 5, in which the bolts 16 extend through the elliptical notches 224 and further protrude from the second heat dissipation unit 20, and that the pads 50 of the second heat dissipation unit 20 are in contact with the card 40. On this point, the first and second heat dissipation units 10, 20 are separated at a short distance and sandwich the card 40 and the chip 42 therebetween. A pair of nuts 26 is then screwed on the bolts 16 to firmly secure the first and second heat dissipation units 10, 20 to opposite sides of the card 40. A pair of springs (not labeled) wraps around the bolts 16 respectively, and is compressed between the nuts 16 and the base plate 22, thereby to press the base plate 22 toward the card 40. Finally, the screws 18, 28 are screwed into the screw holes 126, 226 to reach their final screwed position whereby the fin plates 14, 24 are tightly engaged with the base plates 12, 24, respectively, and the evaporating segments 32 of the heat pipes 30 are firmly fixed in the first heat dissipation unit 10 and the condensing segments 34 of the heat pipes 30 are firmly fixed in the second heat dissipation unit 20 and have an intimate contact therewith. The springs (not labeled) wrapping around the screws 18, 28 are fully compressed to press the fin plates 14, 24 toward the base plates 12, 22 respectively.

According to the preferred embodiment, the heat dissipation device is pre-assembled as a unit except the nuts 26. This is quite advantageous in view of packaging and transportation of the heat dissipating device and assembly of the heat dissipation device to an add-on card, such as a VGA card, since there is no too many trivial components need to be packed and transported separately from the main sub-assembly, and the assembly of the heat dissipation device to the card is very simple.

In operation of the heat dissipation device, heat absorbed by the base plate 12 from the chip 42 has a part dissipated to atmosphere by the fins 120, 140 of the first heat dissipation unit 10, and a part transmitted to the second heat dissipation unit 20 through the heat pipes 30, which is dissipated to atmosphere via the fins 220, 240.

It is believed that the present invention and its advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

We claim:

1. A heat dissipation device for being installed to and dissipating heat from an electronic device comprising:
    a first heat dissipation unit comprising a base plate and a fin plate engaged with the base plate;

a second heat dissipation unit comprising a base plate and a fin plate engaged with the base plate;

a plurality of screws extending through the fin plates and being screwed into the base plates respectively; and at least one heat pipe comprising an evaporating segment received between the base plate and the fin plate of the first heat dissipation unit, and a condensing segment received between the base plate and the fin plate of the second heat dissipation unit, thereby thermally and mechanically connecting the first and second heat dissipation units;

wherein the evaporating segment and the condensing segment of the at least one heat pipe are movably received in the first heat dissipation unit and the second heat dissipation unit respectively before the heat dissipation device is installed to the electronic device, and are firmly fixed in the first heat dissipation unit and the second heat dissipation unit respectively after the heat dissipation device is installed to the electronic device to dissipate heat generated therefrom.

2. The heat dissipation device of claim 1, further comprising a plurality of springs wraps around the screws and presses the fin plates against the base plates, respectively.

3. The heat dissipation device of claim 1, wherein free ends of the at least one heat pipe are configured to have a flat configuration to prevent the at least one heat pipe from moving out of first and second heat dissipation units respectively.

4. The heat dissipation device of claim 1, wherein grooves are defined in the fin plate and the base plate of the first beat dissipation unit, the grooves cooperatively defining at least one hole receiving the evaporating segment of the at least one heat pipe.

5. The heat dissipation device of claim 1, wherein slots are defined in the fin plate and the base plate of the first heat dissipation unit, the slots cooperatively defining at least one hole receiving the condensing segment of the at least one heat pipe.

6. The heat dissipation device of claim 1, wherein a thermal conduct media is applied on outer surfaces of the evaporating segment and the condensing segment of the at least one heat pipe.

7. The heat dissipation device of claim 1, wherein the base plate of the first heat dissipation unit defines two bores therein, and wherein the base plate of the second heat dissipation unit defines two elliptical notches therein, and wherein two pins are extendable through the bores and the notches and protrudes from the base plate of the second heat dissipation unit for use of positioning the first and second heat dissipation units.

8. The heat dissipation device of claim 7, wherein two springs wrap around the pins and presses on the base plate of the second heat dissipation unit.

9. The heat dissipation device of claim 1, wherein the at least one heat pipe is U-shaped.

10. The heat dissipation device of claim 1, wherein a plurality of pads is arranged between the first and second heat dissipation units.

11. A heat dissipation device comprising:
a first heat dissipation unit;
a second heat dissipation unit;
at least one heat pipe having opposite ends thereof received in the first and second heat dissipation units respectively, thereby connecting the first and second heat dissipation units;
wherein the at least one heat pipe is engaged with the first and second heat dissipation units and rotated in the first and second heat dissipation units in such a manner that at least one of the first and second heat dissipation units are movable to approach to or depart from the other and lengths of the opposite ends received in the first and second heat dissipation units are constant.

12. The heat dissipation device of claim 11, wherein the first and second heat dissipation units are parallel to each other.

13. The heat dissipation device of claim 11, wherein pins protrude from the first heat dissipation unit, and are extendable through the second heat dissipation unit when the first and second heat dissipation units approach to each other.

14. A heat dissipation assembly comprising:
a card having a chip thereon;
a first heat dissipation unit disposed at a side of the card and thermally contacting the chip, pins extending from the first heat dissipation unit and extending through the card;
a second heat dissipation unit disposed at an opposite side of the card and defining notches therein;
at least one heat pipe connecting the first and second heat dissipation units; and
positioning elements being engagable with the pins;
wherein the at least one heat pipe is engaged with the first and second heat dissipation units in such a manner that at least one of the first and second heat dissipation units is movable to have the pins in or out of the notches of the second heat dissipation unit except that the positioning elements are engaged with the pins.

15. The heat dissipation assembly of claim 14, wherein a plurality of pads is arranged on the first and second heat dissipation units to isolate the first and second heat dissipation units from the card.

16. A heat dissipation device for being installed to and dissipating heat generated by an electronic card device, comprising:
a first heat dissipation unit for attaching to a first face of the electronic card device;
a second heat dissipating unit for attaching to a second face of the electronic card device, wherein the first face is opposite to the second face;
a heat conductive element thermally connecting the first and second heat dissipating units so that heat can be transferred between the first and second heat dissipation units, the heat conductive element having a first portion rotatably received in the first heat dissipating unit and a second portion rotatably received in the second heat dissipating unit before the heat dissipating device is installed to and dissipate heat from the electronic card device;
wherein the first portion and the second portion of the heat conductive element can rotate relative to the first and second heat dissipation units, respectively after the heat conductive element is assembled to the first and second heat dissipation units.

17. The heat dissipation device of claim 16, further comprising a fastener, and wherein the second heat dissipation unit has at least an elliptical notch, the fastener is attached to the first heat dissipation unit and used for extending through the electronic card device and the elliptical notch of the second heat dissipation unit in order to securely connect the first heat dissipation unit, the electronic card device and the second heat dissipation unit together.

18. The heat dissipation device of claim 17, wherein the heat conductive element is a U-shaped heat pipe.

19. The heat dissipation device of claim 18, wherein each of the first and second heat dissipation units has a base plate for being located close to the electronic card device, and a fin plate attached to the base plate, and the heat pipe has an evaporating segment and a condensing segment, the evaporating segment is sandwiched between the base plate and fin plate of the first heat dissipating unit, and the condensing segment is sandwiched between the base plate and fin plate of the second heat dissipation unit.

20. The heat dissipation device of claim 16, wherein the heat conductive element is a U-shaped heat pipe having an evaporating segment received in the first heat dissipation unit, and a condensing segment received in the second heat dissipation unit.

21. The heat dissipation device of claim 20, wherein free ends of the heat pipe each have a flat configuration.

* * * * *